United States Patent
Buch

(10) Patent No.: US 11,934,267 B1
(45) Date of Patent: Mar. 19, 2024

(54) DATA INVERSION AND UNIDIRECTIONAL ERROR DETECTION

(71) Applicant: Micron Technology, Inc., Boise, ID (US)

(72) Inventor: Steffen Buch, Taufkirchen (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/897,186

(22) Filed: Aug. 28, 2022

(51) Int. Cl.
*G11C 29/00* (2006.01)
*G06F 11/07* (2006.01)
*G06F 11/10* (2006.01)

(52) U.S. Cl.
CPC ...... *G06F 11/1068* (2013.01); *G06F 11/0763* (2013.01); *G06F 11/0772* (2013.01)

(58) Field of Classification Search
CPC ............. G06F 11/1068; G06F 11/0763; G06F 11/0772
See application file for complete search history.

(56) References Cited

U.S. PATENT DOCUMENTS

| | | | |
|---|---|---|---|
| 5,128,947 A * | 7/1992 | Corrigan | G11C 29/74 714/E11.048 |
| 5,285,454 A | 2/1994 | Blaum et al. | |
| 5,745,506 A | 4/1998 | Yamashita et al. | |
| 8,996,951 B2 | 3/2015 | Hyde et al. | |
| 10,951,240 B2 | 3/2021 | Kern et al. | |
| 2007/0043898 A1* | 2/2007 | Ozeki | G06F 11/10 711/100 |
| 2010/0241927 A1* | 9/2010 | Soma | G06F 11/1052 714/763 |
| 2016/0085617 A1* | 3/2016 | Solihin | G11C 7/1006 714/807 |
| 2018/0159558 A1* | 6/2018 | Cha | H03M 13/2906 |
| 2019/0250973 A1* | 8/2019 | Wang | G06F 11/1068 |
| 2020/0104206 A1 | 4/2020 | Kern et al. | |
| 2022/0245027 A1 | 8/2022 | Fackenthal | |
| 2022/0247428 A1 | 8/2022 | Kwak | |

* cited by examiner

*Primary Examiner* — Samir W Rizk
(74) *Attorney, Agent, or Firm* — Brooks, Cameron & Huebsch, PLLC

(57) ABSTRACT

Methods, apparatuses, and non-transitory machine-readable media associated with a data inversion and unidirectional error detection are described. An apparatus for data inversion and unidirectional error detection can include a memory device and a processing device communicatively coupled to the memory device. The processing device can be configured to encode a plurality of binary data bits in an information word, encode the information word using a unidirectional error detecting code, write the encoded information word to the memory device, read the encoded information word from the memory device, and detect an error in the information word using a unidirectional error detecting code. The encoding can include inverting the plurality of binary data bits and adding an inversion data bit to the information word.

20 Claims, 5 Drawing Sheets

US 11,934,267 B1

DATA INVERSION AND UNIDIRECTIONAL ERROR DETECTION

TECHNICAL FIELD

The present disclosure relates generally to apparatuses and methods associated with data inversion and unidirectional error detection.

BACKGROUND

Memory devices are typically provided as internal, semiconductor, integrated circuits in computers or other electronic systems. There are many different types of memory, including volatile and non-volatile memory. Volatile memory can require power to maintain its data (e.g., host data, error data, etc.). Volatile memory can include random access memory (RAM), dynamic random-access memory (DRAM), static random-access memory (SRAM), synchronous dynamic random-access memory (SDRAM), and thyristor random access memory (TRAM), among other types. Non-volatile memory can provide persistent data by retaining stored data when not powered. Non-volatile memory can include NAND flash memory, NOR flash memory, and resistance variable memory, such as phase change random access memory (PCRAM) and resistive random-access memory (RRAM), ferroelectric random-access memory (FeRAM), and magnetoresistive random access memory (MRAM), such as spin torque transfer random access memory (STT RAM), among other types.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
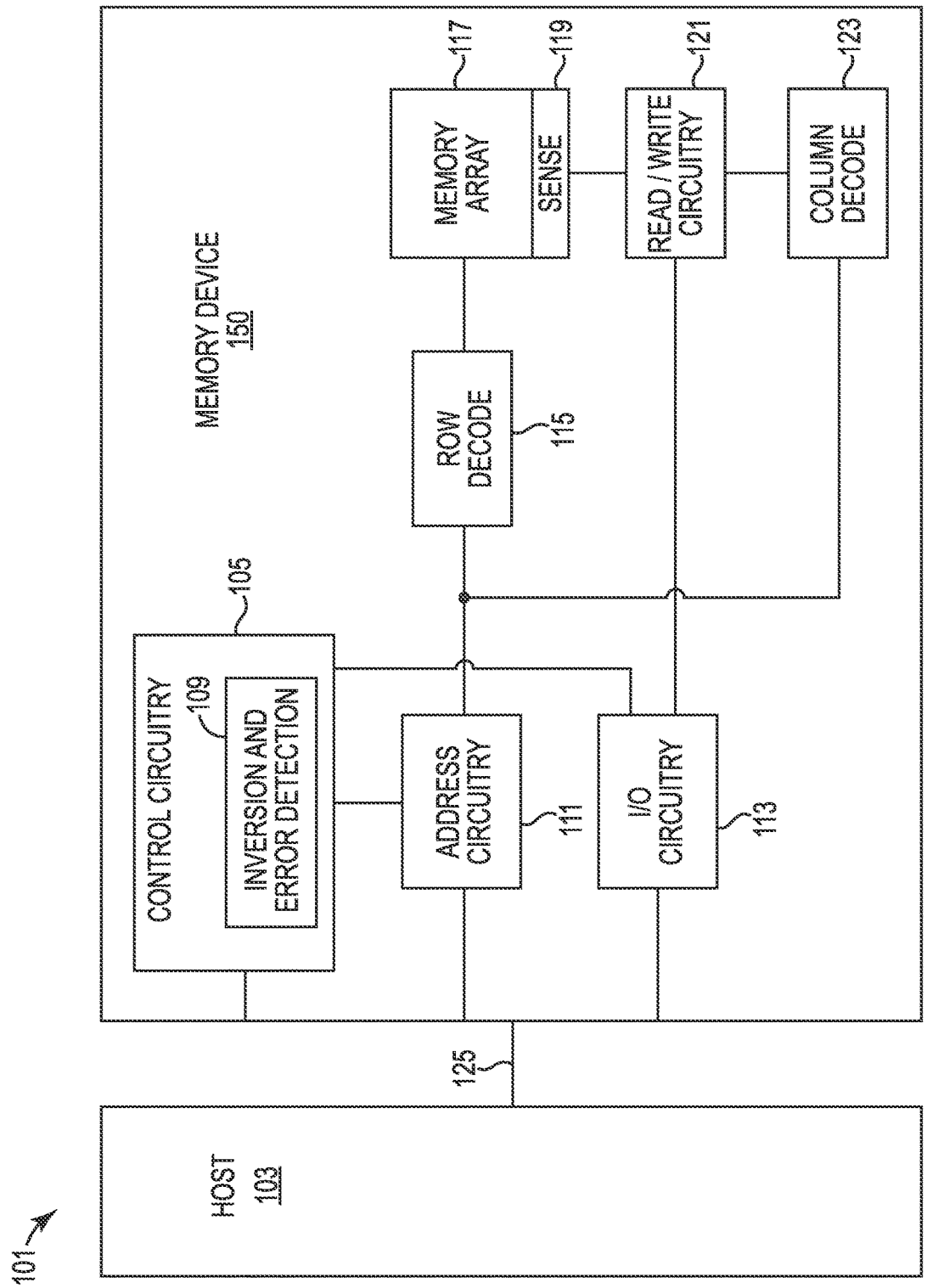
FIG. 1 is a block diagram of an apparatus in the form of a computing system including a memory device in accordance with a number of embodiments of the present disclosure.

Systems, devices, and methods related to data inversion and unidirectional error detection are described. An error in a memory cell (e.g., a DRAM memory cell) can lead to the memory cell losing its charge, which may lead to a transition from a first state (e.g., a "1", a high state, a charged storage state, etc.) to a second state (e.g., a "0", a low state, an uncharged storage state, etc.) in a bit line, for instance through charge leakage or a neutron particle hit. This code error, along with the large amount of power consumed by memory cells, can negatively affect performance of the memory cell and/or associated devices.

Some approaches to memory cell management include the use of an error detection code or the use of data encoding. However, utilizing only an error detection code may not address robustness in memory cells, and utilizing only data encoding may not address power consumption issues and/or memory cells losing charge. In contrast, examples of the present disclosure allow for encoding and error detection resulting in improved robustness in asymmetric channels and reduced power consumption of data transfers between a memory device and a host.

Examples of the present disclosure can include an apparatus comprising a memory device and a processing device communicatively coupled to the memory device. The processing device can encode a plurality of binary data bits in an information word, and the encoding can include inverting the plurality of binary data bits and adding an inversion data bit to the information word. The information word can be encoded using a unidirectional error detecting code (e.g., Berger code), and the encoded information word can be written to the memory device and read from the memory device. The processing device can detect an error in the encoded plurality of binary data bits using the unidirectional error detecting code.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. For example, 330 can reference element "30" in FIG. 3, and a similar element can be referenced as 430 in FIG. 4. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a block diagram of an apparatus in the form of a computing system 101 including a memory device 150 in accordance with a number of embodiments of the present disclosure. The memory device 150 is coupled to a host 103 via an interface 125. As used herein, a host 103, a memory device 150, or a memory array 117, for example, might also be separately considered to be an "apparatus." The interface 125 can pass control, address, data, and other signals between the memory device 150 and the host 103. The interface 125 can include a command bus (e.g., coupled to the control circuitry 105), an address bus (e.g., coupled to the address circuitry 111), and a data bus (e.g., coupled to the input/output (I/O) circuitry 113). In some embodiments, the command bus and the address bus can be comprised of a common command/address bus. In some embodiments, the command bus, the address bus, and the data bus can be part of a common bus. The command bus can pass signals between the host 103 and the control circuitry 105 such as clock signals for timing, reset signals, chip selects, parity information, alerts, etc. The address bus can pass signals between the host 103 and the address circuitry 111 such as logical addresses of memory banks in the memory array 117 for memory operations. The interface 125 can be a physical interface employing a suitable protocol. Such a protocol may be custom or proprietary, or the interface 125 may employ a standardized protocol, such as Peripheral Component Interconnect Express (PCIe), Gen-Z interconnect, cache coherent interconnect for accelerators (CCIX), etc. In some cases, the control circuitry 105 is a register clock driver (RCD), such as RCD employed on an RDIMM or LRDIMM.

The memory device 150 and host 103 can be a satellite, a communications tower, a personal laptop computer, a desktop computer, a digital camera, a mobile telephone, a memory card reader, an Internet-of-Things (IoT) enabled device, an automobile, among various other types of systems. For clarity, the system 101 has been simplified to focus on features with particular relevance to the present disclosure. The host 103 can include a number of processing resources (e.g., one or more processors, microprocessors, or some other type of controlling circuitry) capable of accessing the memory device 150.

The memory device 150 can provide main memory for the host 103 or can be used as additional memory or storage for the host 103. By way of example, the memory device 150 can be a dual in-line memory module (DIMM) including memory arrays 117 operated as double data rate (DDR) DRAM, such as DDR5, a graphics DDR DRAM, such as GDDR6, or another type of memory system. Embodiments are not limited to a particular type of memory device 150. Other examples of memory arrays 117 include RAM, ROM, SDRAM, LPDRAM, PCRAM, RRAM, flash memory, and three-dimensional cross-point, among others. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The control circuitry 105 can decode signals provided by the host 103. The control circuitry 105 can also be referred to as a command input and control circuit and can represent the functionality of different discrete ASICs or portions of different ASICs depending on the implementation. The signals can be commands provided by the host 103. These signals can include chip enable signals, write enable signals, and address latch signals, among others, that are used to control operations performed on the memory array 117. Such operations can include data read operations, data write operations, data erase operations, data move operations, etc. The control circuitry 105 can comprise a state machine, a sequencer, and/or some other type of control circuitry, which may be implemented in the form of hardware, firmware, or software, or any combination of the three.

Data can be provided to and/or from the memory array 117 via data lines coupling the memory array 117 to input/output (I/O) circuitry 113 via read/write circuitry 121. The I/O circuitry 113 can be used for bi-directional data communication with the host 103 over an interface. The read/write circuitry 121 is used to write data to the memory array 117 or read data from the memory array 117. As an example, the read/write circuitry 121 can comprise various drivers, latch circuitry, etc. In some embodiments, the data path can bypass the control circuitry 105.

The memory device 150 includes address circuitry 111 to latch address signals provided over an interface. Address signals are received and decoded by a row decoder 115 and a column decoder 123 to access the memory array 117. Data can be read from memory array 117 by sensing voltage and/or current changes on the sense lines using sensing circuitry 119. The sensing circuitry 119 can be coupled to the memory array 117. The sensing circuitry 119 can comprise, for example, sense amplifiers that can read and latch a page (e.g., row) of data from the memory array 117. Sensing (e.g., reading) a bit stored in a memory cell can involve sensing a relatively small voltage difference on a pair of sense lines, which may be referred to as digit lines or data lines.

The memory array 117 can comprise memory cells arranged in rows coupled by access lines (which may be referred to herein as word lines or select lines) and columns coupled by sense lines (which may be referred to herein as digit lines or data lines). Although the memory array 117 is shown as a single memory array, the memory array 117 can represent a plurality of memory arrays arraigned in banks of the memory device 150. The memory array 117 can include a number of memory cells, such as volatile memory cells (e.g., DRAM memory cells, among other types of volatile memory cells) and/or non-volatile memory cells (e.g., RRAM memory cells, among other types of non-volatile memory cells).

The control circuitry 105 can also include inversion and error detection circuitry 109. In some embodiments, the inversion and error detection circuitry 109 comprises an application specific integrated circuit (ASIC) configured to perform the inversion and error detection examples described herein. In some embodiments, the inversion and error detection circuitry 109 represents functionality of the control circuitry 105 that is not embodied in separate discrete circuitry. The term "controller" is used herein to refer to the functionality of the host 103, the control circuitry 105, and/or the inversion and error detection circuitry 109. The controller can be configured to perform inversion and error detection in a memory device such as memory device 150 or during transmission of data between the host 103 and the memory device 150 or the host 103 and a different memory device.

For instance, in a non-limiting an example, a plurality of data bits having more 1s than 0s can be encoded using data bit inversion and encoded using a unidirectional error correcting code. The encoded data can be written to a storage device, read from the storage device, and decoded (e.g., error detection) using the unidirectional error detecting code. If an error is not detected, the data can undergo inversion decoding. If an error is detected, the error can be signaled.

Figure 2:
FIG. 2 is a flow chart representing a method for data inversion and unidirectional error detection in accordance with a number of embodiments of the present disclosure.

FIG. 2 is a flow chart representing a method for data inversion and unidirectional error detection in accordance with a number of embodiments of the present disclosure. Unidirectional error detecting code can include a code or codes that can detect unidirectional errors that only flip a first state (e.g., "1"s) into a second state (e.g., "0") or only the second state into the first state, such as in asymmetric channels. An asymmetric channel, also known as a z-channel, may have a property such that out of two states (e.g., zero or one), only one can have an error. For example, in DRAM, an error in a memory cell can lead to the memory cell losing its charge. This which can lead to a transition from a first state such as a charged storage state to a second state such as an uncharged storage state, for instance through charge leakage or a neutron particle hit. A sudden gain of charge (e.g., an erroneous transition from the second state to the first state) can occur but is less common that an erroneous transition from the first state to the second state.

An example of a unidirectional error detecting code is a Berger code. Parity bits of a Berger code can be computed by counting all bits in a second state, referred to with respect to FIG. 2 as "zeros," in an information word and expressing that number in natural binary. A set of n–k information bits and k parity bits can be considered, and a binary number corresponding to all bits in a first state, referred to with respect to FIG. 2 as "ones," in the n–k information bits can be formed. The binary complement of each digit in the binary number can be taken such that all zeros are changed to ones and all ones are changed to zeros. In such an example, k can be calculated as ceil(log$_2$ (d+1)) with the number of data bits being d=n–k.

In a non-limiting unidirectional error detecting code (e.g., Berger code) example, the number of data bits is 8 (e.g., d=8), the required number of parity bits is 4 (e.g., k=4), and the information word (e.g., codeword) size is 10 (e.g., n=10). In such an example, the data bits in the information word may be 01101110, which includes 5 ones. A binary number corresponding to the number of ones is 0101, with a bit-wise complement of 1010. As such, the information word is 01101110|1010 for this unidirectional error detecting code example. An error, such as a transition from one to zero, either in data bits or parity bits, leads to a mismatch of the number of zeros in the data, and the binary number encoded in the parity bits.

Data inversion encoding can be used to reduce power consumption and improve robustness in asymmetric channels. Data inversion can be used, for instance, in DDR4 and other DRAM standards to reduce power consumption of data transfers between a DRAM memory cell and a host and/or can be used for data stored in DRAM memory cells. During data inversion encoding, an additional bit is introduced that indicates a polarity of the data. The data is inverted and the polarity bit set, such that the number of ones, which are more error-prone and lead to higher power consumption than zeros, is reduced (e.g., such that there are more zeros than ones).

In a non-limiting data inversion encoding example, the data bits can be 01101110, which when inverted becomes 1001000. In such an example, the information word (e.g., codeword) is 10010001|1. The number of ones is reduced from four to three. The reduction can increase with more data bits per information word. In an example where more zeros are present than 1 (e.g., 11000001), the data bits are not inverted, and the information word is 11000001|0. In both examples, the number of ones is reduced.

Examples of the present disclosure can utilize unidirectional error code and data inversion encoding for which the number of additional parity bits is not k=ceil(log$_2$ (d+1))+1 (e.g., Berger code parity bits plus data inversion bit) but instead is $k_{Modified}$=ceil(log$_2$ (floor (d/2)+2))+1. An example of such encoding is illustrated and described with respect to FIG. 2.

In the example illustrated in FIG. 2, both data inversion and unidirectional error detection are used. For instance, an information word can include data bits 01101110, as illustrated at 206. When data inversion 204 is applied to the data bits, the result is 10010001, as illustrated at 208. The inversion bit can be added, the result being 10010001|1 as illustrated at 210. The addition of unidirectional error detecting code parity bits, such as a Berger code parity bit, can now be based on the reduced number of ones for data bits and inversion bits. For instance, the data bits with inversion coding were 10010001|1 as illustrated at 210, and the data bits subsequent to the use of the unidirectional error detecting code 212 is 10010001|1|011, as illustrated at 214.

The number of data bits for the unidirectional error detecting code is reduced in the example because the overall number of ones in the data bits plus the inversion bits is reduced by the inversion encoding. For example, for eight data bits the maximum number of ones is 4+1 (e.g., four in the data bits and one for the additional inversion bit). As such, only ceil (log 2 (floor(d/2)+2))=3 bits need to be added for unidirectional error detecting code (e.g., Berger code) detecting.

The overall number check bits to be added for the combined data inversion and unidirectional error detecting coding is now $k_{Modified}$=ceil(log$_2$ (floor(d/2)+2))+1=3+1=4. While the overall number of ones in the information word is reduced, the added overhead stays the same in this case.

In some examples, for data bit sizes of $2^a$-1 and $2^a$-2 where a is any integer number greater than zero, the modified code may include one more parity bit compared to other unidirectional error detecting code. For data storage using code word sizes of $2^a$, for example, the number of overhead (e.g., parity) bits to be added in the other unidirectional error detecting code and the modified code is the same.

Decoding of the information word can include, for instance, utilizing a unidirectional error detecting code (e.g., Berger code) to check for errors. When no errors are detected, the data inversion can be reversed when the inversion bit is set to one, and the data bits can be returned. When an error is detected, a notification can be triggered indicating incorrect data. If the data is inverted, the extra bit can be removed, but the data not inverted, and the data can be sent to a host.

Figure 3:
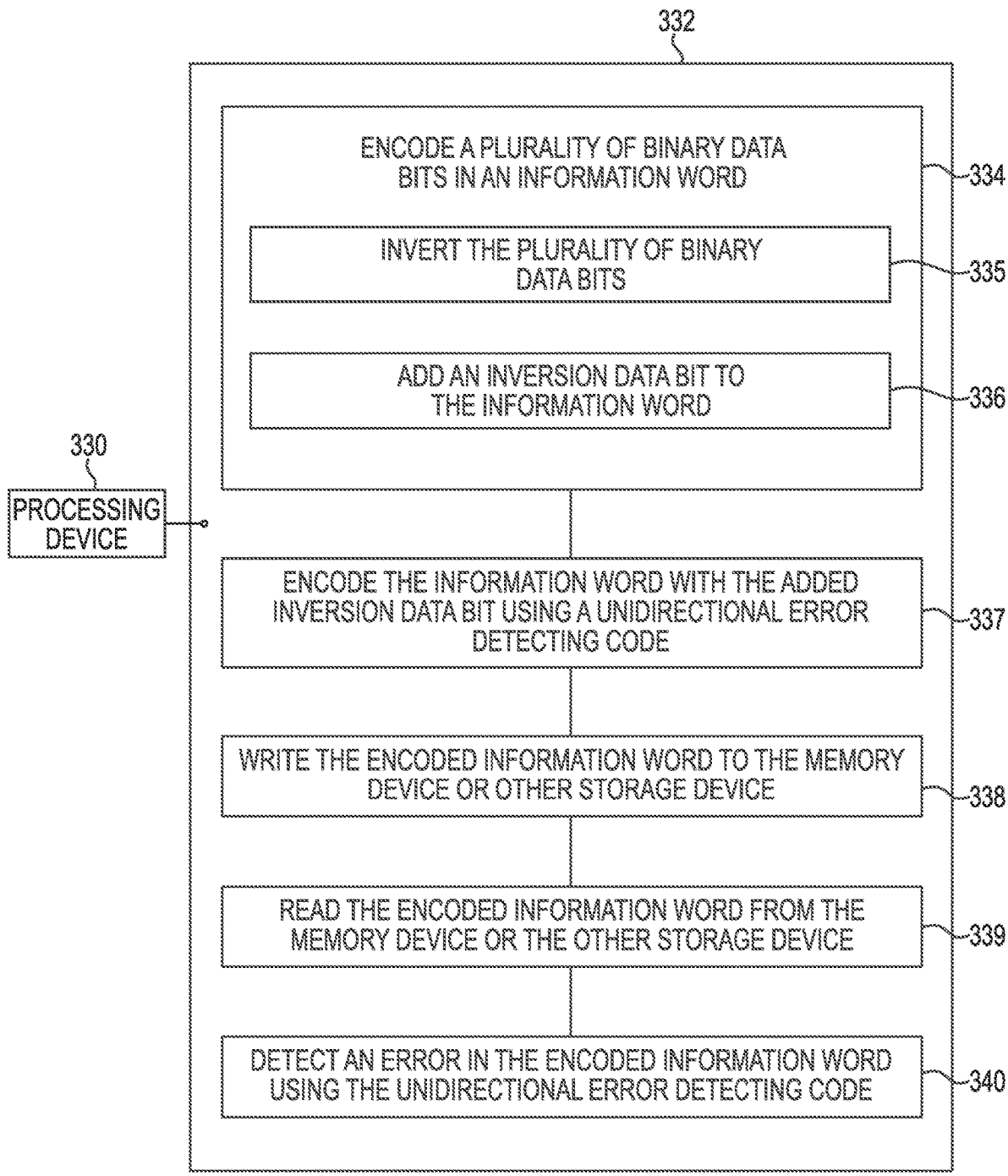
FIG. 3 is a functional diagram representing a processing device in communication with a memory device having instructions written thereon in accordance with a number of embodiments of the present disclosure.

FIG. 3 is a functional diagram representing a processing device 330 in communication with a memory device 332 (e.g., a memory resource) having instructions 334, 335, 336, 337, 338, 339, 340 written thereon in accordance with a number of embodiments of the present disclosure. The device illustrated in FIG. 3 can be a server or a computing device (among others) and can include the processing device 330. The device can further include the memory device 332 (e.g., a non-transitory MRM), on which may be stored instructions, such as instructions 334, 335, 336, 337, 338, 339, 340. The device, in some examples, may be analogous to the device described with respect to FIG. 4 including processing devices 430 and memory device 432. Although the following descriptions refer to a processing device and a memory device, the descriptions may also apply to a system with multiple processing devices and multiple memory devices. In such examples, the instructions may be distributed (e.g., stored) across multiple memory devices and the instructions may be distributed (e.g., executed by) across multiple processing devices.

The memory device 332 may be electronic, magnetic, optical, or other physical storage device that stores executable instructions. Thus, the memory device 332 may be, for example, non-volatile or volatile memory. In some examples, the memory device 332 is a non-transitory MRM comprising RAM, an Electrically-Erasable Programmable ROM (EEPROM), a storage drive, an optical disc, and the like. The memory device 332 may be disposed within a controller and/or computing device. In this example, the executable instructions 334, 336 can be "installed" on the device. Additionally, and/or alternatively, the memory device 332 can be a portable, external or remote storage medium, for example, that allows the system to download the instructions 334, 336 from the portable/external/remote storage medium. In this situation, the executable instructions may be part of an "installation package". As described herein, the memory device 332 can be encoded with executable instructions for data inversion and unidirectional error detection.

The instructions 334, when executed by a processing device such as the processing device 330 can include instructions to encode a plurality of binary data bits in an information word. The encoding can include, for example, inverting the plurality of binary data bits at 335 and adding an inversion data bit to the information word at 336. The plurality of binary data bits can be inverted to reduce the number of data bits in a first state (e.g., a high state) as compared to those in a second state (e.g., a low state). The added inversion data bit, for instance, may be a parity bit that acts as a check on a set of binary values. The added inversion data bit can be determined such that a number of bits in the first state in a data set plus the parity bit is even.

The instructions 337, when executed by a processing device such as the processing device 330 can include instructions to encode the information word with the added inversion data bit using a unidirectional error detecting code (e.g., Berger code) and the instructions 338 and 339 when executed by a processing device such as the processing device 330 can include instructions to write the encoded information word to the memory device 332 or other storage device and read the encoded information word from the memory device 332 or other storage device, respectively.

The instructions 340, when executed by a processing device such as the processing device 330, can include instructions to detect an error in the encoded information word (e.g., an erroneous transition from a first state to a second state) using the unidirectional error detecting code (e.g., Berger code). Subsequent to data inversion, unidirectional error detecting code parity bits can be based on the reduced number of data bits in the first state and the added inversion bit.

The error detection, in some examples, can occur in an asymmetric channel such that technology and device width can vary from one channel to the other. In some examples, if different speed DIMMs are used between channels, the slowest memory timing can be used. The detected error, in some examples, includes a unidirectional error that flips data in a first state (e.g., "1"s) into data in a second state (e.g., "0"s) or the second state into the first state, and/or the detected error, in some instances, includes the memory device 332 (e.g., a DRAM device, a DDR4 DRAM device, etc.) losing its charge, or a different memory device coupled to the processing device losing its charge.

In some examples, encoding the plurality of binary data bits occurs during transmission of the plurality of binary data bits. In some instances, this can reduce power consumption of data transfers between the memory device 332 or the different memory device and the host. In some examples, encoding the plurality of binary data bits occurs during storage (e.g., in a DRAM memory cell or other memory cell operating with an asymmetric channel) of the plurality of binary data bits. Decoding of the data can include unidirectional error detecting decoding to check for errors during storage or transmission of data, and the data inversion can be reversed or maintained depending on whether an error was detected (reverse) or not detected (maintain).

Figure 4:
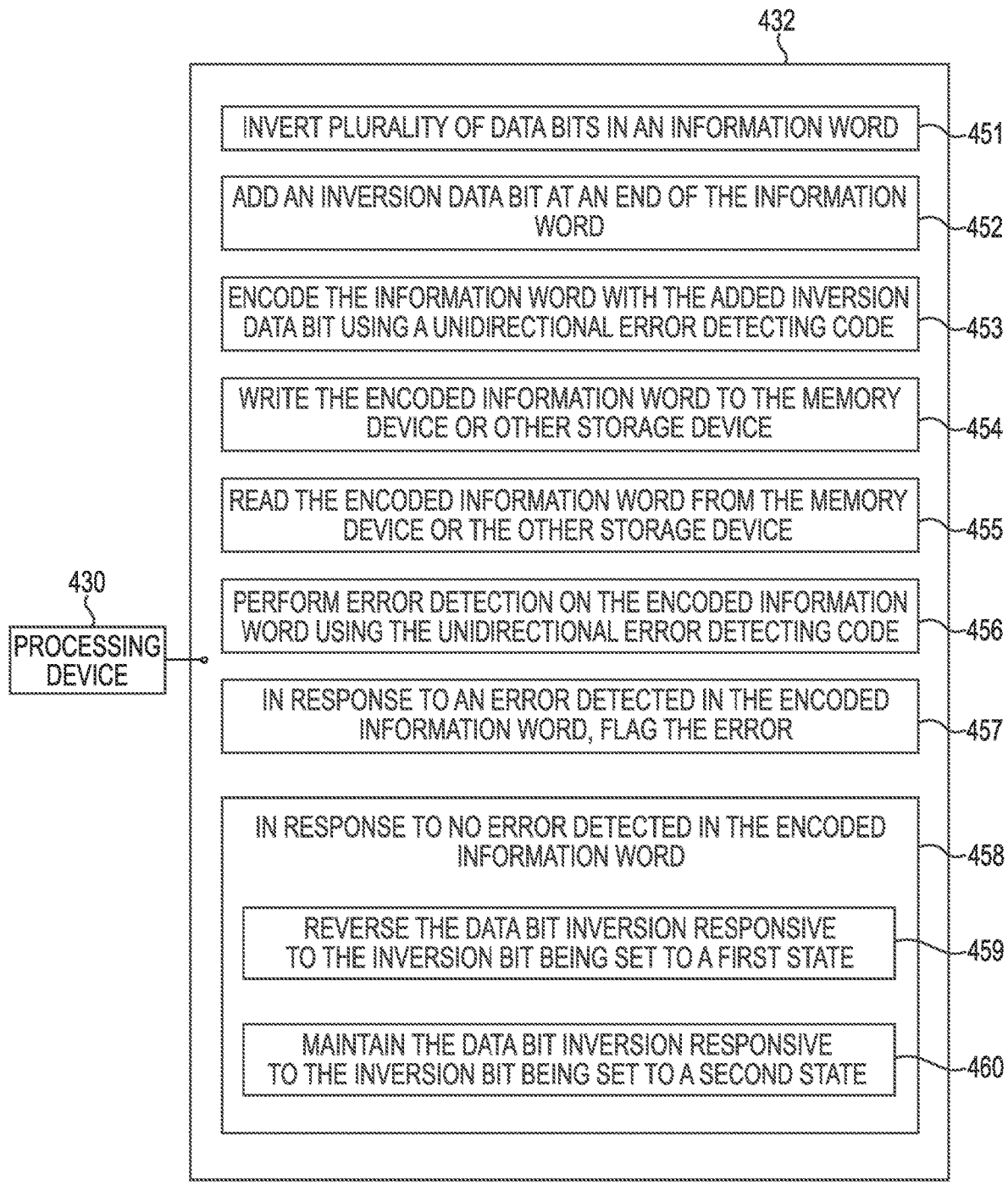
FIG. 4 is another functional diagram representing a processing device in communication with a memory device having instructions written thereon in accordance with a number of embodiments of the present disclosure.

FIG. 4 is another functional diagram representing a processing device 430 in communication with a memory device 432 having instructions 451, 452, 453, 454, 456, 457, 458, 459, 460 written thereon in accordance with a number of embodiments of the present disclosure. In some examples, the processing device 430 and the memory device 432 comprise a device and may be analogous to the processing device 330 and the memory device 332 illustrated in FIG. 3.

The instructions 451, when executed by a processing device such as the processing device 430, can cause a plurality of data bits in an information word to be inverted. For instance, data bits in a first state (e.g., a "1" or a high state) can be inverted to a second state (e.g., a "0" or a low state) when more data bits are in the first state than the second state. This can reduce power consumption, in some examples, for instance if the high state is a charged storage state.

The instructions 452, when executed by a processing device such as the processing device 430, can cause an inversion data bit to be added at an end of the information word. For example, the added inversion bit can indicate a polarity of the data. The associated data bits can be inverted so that the number of data bits in the first state, which may be more error-prone and/or lead to higher power consumption, is reduced. The inversion may occur during data transfer (e.g., between a memory device and a host) or on data stored in memory cells.

The instructions 453, when executed by a processing device such as the processing device 430 can include instructions to encode the information word with the added inversion data bit using a unidirectional error detecting code (e.g., Berger code) and the instructions 455 and 456 when executed by a processing device such as the processing device 430 can include instructions to write the encoded information word to the memory device 432 or other storage device and read the encoded information word from the memory device 432 or other storage device, respectively.

The instructions 456, when executed by a processing device such as the processing device 430 can include instructions executable to perform error detection on the information word using the unidirectional error detecting code. In some examples, the unidirectional error detecting code is a Berger code, and the plurality of data bits includes more than $2^8$ data bits. For instance, when there are less than $2^8$ data bits, an additional parity bit may be added to an information word, but when there are more than $2^8$ data bits, no additional parity bit is needed, allowing for a reduced number of bits in a first state (e.g., a minimized number of "1"s).

The instructions 457, when executed by a processing device such as the processing device 430, can cause an error to be flagged in response to the error detected in the encoded information word. For instance, a notification can be provided that the data being transmitted and/or stored is not correct and may need to be addressed. The instructions 459 and 460, in contrast, can be executable in response to no error detected in the encoded information word (e.g., as illustrated at 458). The instructions 459, when executed by a processing device such as the processing device 430, can cause the data bit inversion to be reversed responsive to the inversion bit being set to a first state (e.g., a "1"), and the instructions 460, when executed by a processing device such as the processing device 430, can cause the data bit inversion to be maintained responsive to the inversion bit being set to a second state (e.g., a "0").

In some examples, the memory resource 432 has instructions executable to remove the added inversion data bit subsequent to the error detection performance. For instance, whether the error is detected and flagged or no error is detected, the added inversion data bit can be removed. The memory resource 432 can be DRAM memory cell or other memory cell having an asymmetric channel, in some examples, and the plurality of data bits can be stored in the memory device 432 or a different memory cell. The inversion of the plurality of data bits, the adding of the inversion data bit, and/or the error detection can occur during the storage in the memory resource 432 or the different DRAM memory cell or during transmission of the plurality of data bits (e.g., to a host).

Figure 5:
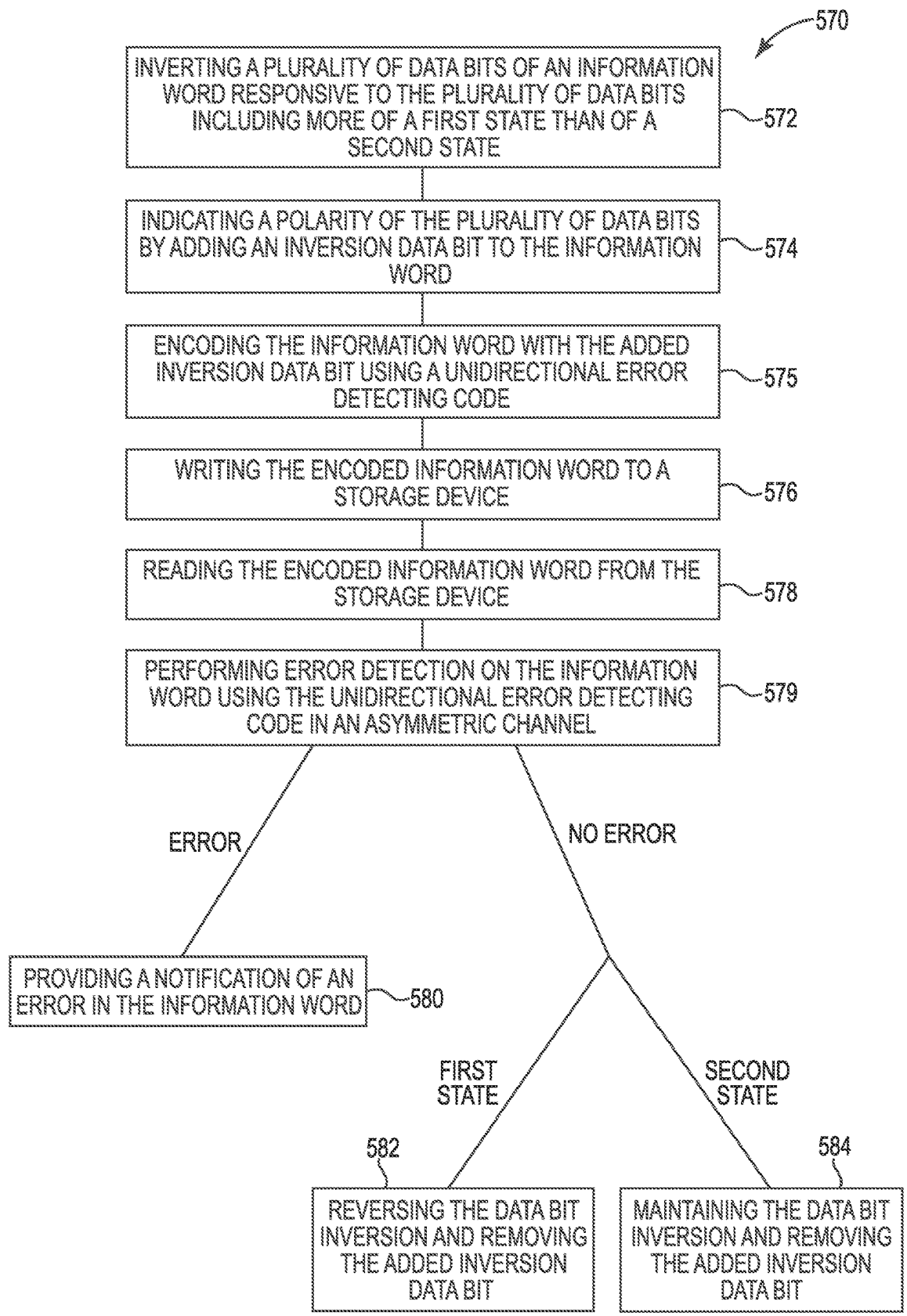
FIG. 5 is a flow diagram representing an example method for data inversion and unidirectional error detection in accordance with a number of embodiments of the present disclosure.

FIG. 5 is a flow diagram representing an example method 570 for data inversion and unidirectional error detection in accordance with a number of embodiments of the present disclosure. The method 570 may be performed, in some examples, using a device such as those described with respect to FIGS. 3 and 4. The method 570 can include data inversion and unidirectional error detection that can reduce power consumption in data transfers between a memory device and a host or while the data is stored in the memory device.

For instance, by reducing the number of data bits in a first state (e.g., a "1" state, a charged storage state, a high state, etc.), error potential can be reduced, as an error is more likely to occur moving from the first state to a second state (e.g., a "0" state, an uncharged storage state, a low state, etc.), as opposed to moving from the second state to the first state. This can result in reduced power consumption and improved robustness.

The method 570, at 572, can include inverting a plurality of data bits of an information word responsive to the plurality of data bits including more of a first state (e.g., "1" s) than a second state (e.g., "0" s). For example, if an information word is 11011, which includes more data bits of a first that than a second state, the inversion can be 00100. In some examples, the inversion can be done in storage or during data transmission, such as encoding of a bus transmission for a low-power system.

At 574, the method 570 can include indicating a polarity of the plurality of data bits by adding an inversion data bit to the information word. In the aforementioned example, this can include the addition of data bit of a first state to the information word, for instance 00100|1. For example, indicating the polarity of the plurality of data bits can include reducing the number of bits in the first state in the plurality of data bits.

At 575, the method can include encoding the information word with the added inversion data bit using a unidirectional error detecting code (e.g., Berger code), and at 576 and 578, the method can include writing the encoded information word to a storage device and reading the encoded information word from the storage device, respectively.

The method 570, at 579 can include performing error detection on the information word using a unidirectional error detecting code in an asymmetric channel. The error detection can include the addition of parity bits based on the reduced number of bits in the first state for the data bits and the inversion bit. The number of parity bits can be reduced as compared to error detection performed without first performing the data inversion because the overall number of data bits in the first state plus the inversion bit is reduced by the inversion encoding. This can reduce the number of errors because of a resulting lower likelihood of the first state flipping to the second state (e.g., through charge leakage or a neutron particle hit).

At 580, the method 570 can include providing a notification of an error in the information word in response to a detected error, for instance via a message, pop-up, or other communication method. In response to no error detected in the plurality of data bits and the added inversion data bit, the method 570, at 582, can include reversing the data bit inversion and removing the added inversion data bit responsive to the inversion bit being set to the first state and at 584, the method 570 can include maintaining the data bit inversion and removing the added inversion data bit responsive to the inversion bit being set to the second state. For example, if the added inversion data bit is set to the second state, no inversion is needed because the number of data bits in the first state is already reduced. The plurality of data bits can be transmitted to a host responsive to reversing the data bit inversion or the maintaining of the data bit inversion.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory device; and
a processing device communicatively coupled to the memory device, wherein the processing device is configured to:
encode a plurality of binary data bits in an information word, wherein the encoding comprises:
inverting each of the plurality of binary data bits; and
adding an inversion data bit to the information word;
encode the information word with the added inversion data bit using a unidirectional error detecting code;
write the encoded information word to the memory device or other storage device;
read the encoded information word from the memory device or the other storage device; and
detect an error in the encoded information word using the unidirectional error detecting code.

2. The apparatus of claim 1, wherein the error detection occurs in an asymmetric channel.

3. The apparatus of claim 1, wherein the detected error is a unidirectional error that flips ones into zeroes or zeroes into ones.

4. The apparatus of claim 1, wherein the detected error comprises the memory device losing its charge, or a different memory device coupled to the processing device losing its charge.

5. The apparatus of claim 1, further comprising the processing device to encode the plurality of binary data bits during transmission of the plurality of binary data bits.

6. The apparatus of claim 1, further comprising the processing device to encode the plurality of binary data bits during storage of the plurality of binary data bits.

7. The apparatus of claim 1, wherein inverting each of the plurality of binary data bits is responsive to the plurality of binary data bits including more of a first state than a second state.

8. The apparatus of claim 7, wherein the inverted plurality of binary data bits includes a reduced quantity of binary data bits in the first state.

9. The apparatus of claim 1, wherein the added inversion data bit is a parity bit.

10. A non-transitory machine-readable medium comprising a processing device in communication with a memory device having instructions executable to:
invert each of a plurality of data bits in an information word;
add an inversion data bit at an end of the information word;
encode the information word with the added inversion data bit using a unidirectional error detecting code;
write the encoded information word to the memory device or other storage device;
read the encoded information word from the memory device or the other storage device; and
perform error detection on the encoded information word using the unidirectional error detecting code;
in response to an error detected in the encoded information word, flag the error; and
in response to no error detected in the encoded information word:
reverse the data bit inversion responsive to the inversion bit being set to a first state; and
maintain the data bit inversion responsive to the inversion bit being set to a second state.

11. The medium of claim 10, wherein the memory device has instructions executable to remove the added inversion data bit subsequent to the error detection performance.

12. The medium of claim 10, wherein thy: unidirectional error detecting code is a Berger code.

13. The medium of claim 10, wherein the plurality of data bits includes more than $2^8$ data bits.

14. The medium of claim 10, wherein the memory device has instructions executable to invert the plurality of data bits and add the inversion data bit during transmission of the plurality of data bits.

15. The medium of claim 10, wherein the memory device is a memory cell having an asymmetric channel, and the plurality of data bits is stored in the memory device or a different memory cell.

16. A method, comprising:
inverting each of a plurality of data bits of an information word responsive to the plurality of data bits including more of a first state than a second state;
indicating a polarity of the plurality of data bits by adding an inversion data bit to the information word;
encoding the information word with the added inversion data bit using a unidirectional error detecting code;
writing the encoded information word to a storage device;
reading the encoded information word from the storage device; and
performing error detection on the information word using the unidirectional error detecting code in an asymmetric channel;
providing a notification of an error in the information word in response to a detected error; and
in response to no error detected in the information word:
reversing the data bit inversion and removing the added inversion data bit responsive to the inversion bit being set to the first state; and
maintaining the data bit inversion and removing the added inversion data bit responsive to the inversion bit being set to the second state.

17. The method of claim 16, further comprising indicating the polarity of the plurality of data bits by reducing the number of the first state in the plurality of data bits.

18. The method of claim 16, further comprising transmitting the plurality of data bits to a host responsive to reversing the data bit inversion and removing the added inversion data bit responsive to the inversion bit being set to the first state.

19. The method of claim 16, further comprising transmitting the plurality of data bits to a host responsive to maintaining the data bit inversion and removing the added inversion data bit responsive to the inversion bit being set to the second state.

20. The method of claim 16, wherein inverting the plurality of data bits comprises inversion encoding of a bus transmission for a low-power system.

* * * * *